Patented Jan. 18, 1938

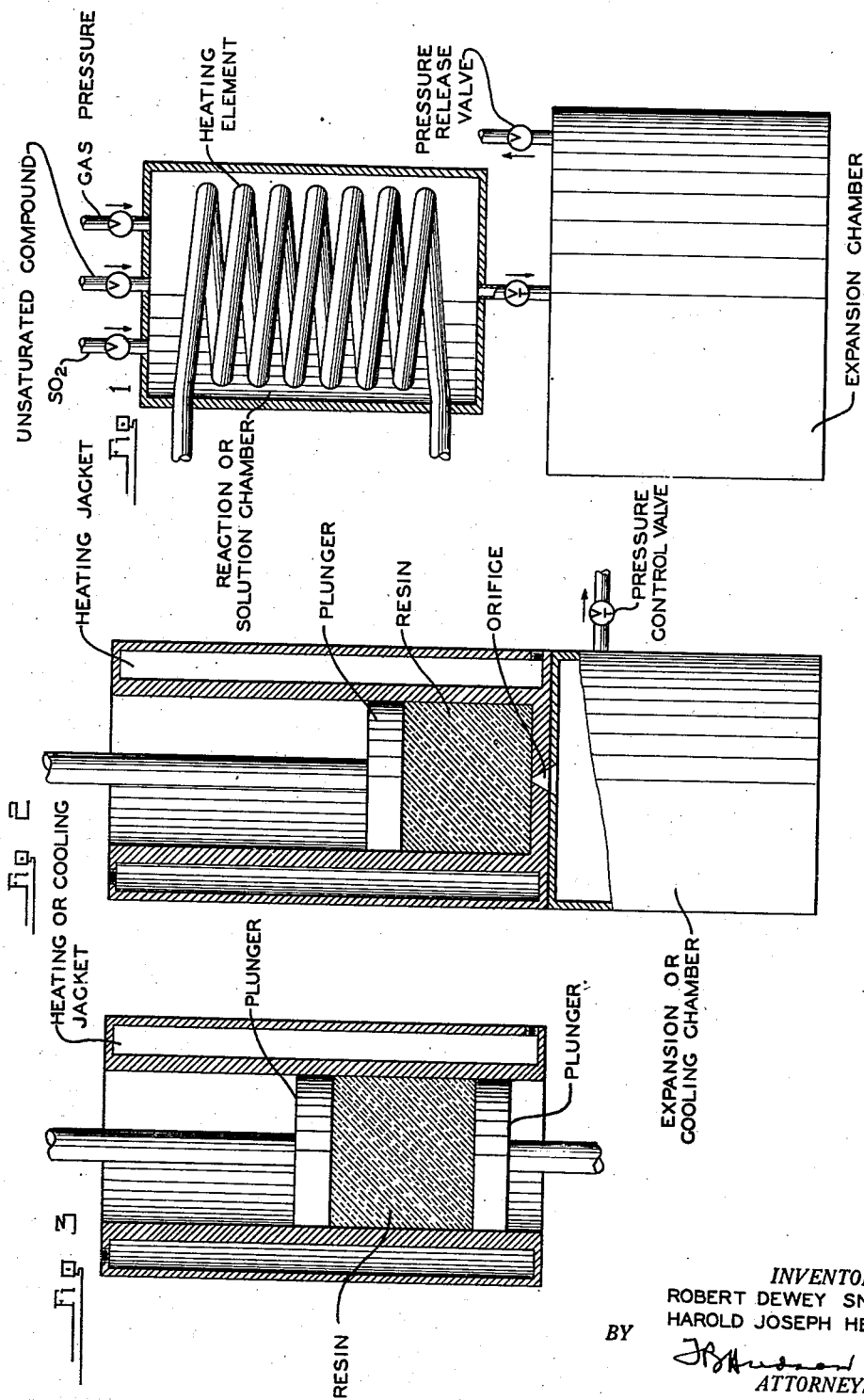

2,105,511

UNITED STATES PATENT OFFICE 2,105,511

INSULATING AND SOUND PROOFING MATERIAL AND METHOD OF PRODUCING SAME

Robert Dewey Snow and Harold Joseph Hepp, Bartlesville, Okla., assignors to Phillips Petroleum Company, Bartlesville, Okla., a corporation of Delaware Application April 18, 1934, Serial No. 721,203

3 Claims. (Cl. 106—22)

This invention relates to the manufacture of multicellular heat and sound insulating materials from the high molecular weight reaction products of sulfur dioxide and unsaturated compounds, all as more fully hereinafter described and claimed.

It is well known that cellular material having a large volume percentage of dead gas space in the form of small cells generally has good heat insulating and sound proofing properties. Such material, by virtue of its cellular structure, minimizes convection currents in the gases present, and thus takes advantage of the very low heat conductivity of still gases.

We have found that such a material of cellular structure, suitable for sound proofing, and heat insulation at low or moderately elevated temperatures, can be manufactured from the resinous or high molecular weight polymeric compounds formed by the reaction of sulfur dioxide with unsaturated compounds. Such compounds have been described, for example, in British Patent 11,635 (1914) and in U. S. patent application Serial No. 599,350, filed March 16, 1932, but of those described, the most suitable for the manufacture of our product are the complexes of those olefins containing more than three carbon atoms to the molecule.

Such complexes will absorb considerable quantities of sulfur dioxide and form a gelatinous or viscous solution. If the excess sulfur dioxide in the gel be limited to a small amount, and the gel heated under pressure till it becomes fluid, a rapid release of the pressure will cause the gel to expand, assuming a light, fairly uniform, cellular form whose structure is preserved by cooling. The expanded material may thus be formed by controlled elimination of excess sulfur dioxide.

We have also found another way in which expanded, cellular material may be manufactured from these complexes of sulfur dioxide and unsaturated compounds. Virtually all such complexes begin to decompose even below the temperatures at which they soften appreciably, regenerating sulfur dioxide and the unsaturated compound. This decomposition reaction is generally slow below the softening temperatures, but increases rapidly as the temperature increases. If the solid, resinous material, free from excess sulfur dioxide, is heated a short time at a temperature at which it is fluid, and under pressure sufficient to prevent the formation of a gaseous phase, it soon accumulates enough decomposition products to expand the resin to a cellular form when the pressure is released. Immediate cooling is then provided to prevent further flow of resin in the intercellular films.

The products produced by either of the above processes are light in weight, but quite strong and resistant to physical damage and disintegration. From the foregoing, it is evident that they can be produced either by controlled elimination of excess sulfur dioxide from a gel of the resinous material in sulfur dioxide, or by heating the solid resinous material under pressure to a temperature above its softening point, quickly releasing the pressure and cooling the expanded product so produced.

The methods of practicing the processes of the present invention are illustrated by the following examples and the accompanying drawing.

Example I

One mol. of butene-2 and one and one-quarter mols of $SO_2$ are mixed with a quantity of $AgNO_3$, $LiNO_3$, $NH_4NO_3$ or other suitable catalyst, corresponding to 0.01–0.1 per cent of the weight of $SO_2$ and olefin, and are allowed to react in a pressure vessel. When reaction is complete, the product is warmed to the desired degree of fluidity and is then forced by pressure through an orific into an expansion chamber where the evaporation of $SO_2$ is controlled by pressure. In general the cooling effect due to the evaporation of $SO_2$ is sufficient and the expansion chamber need not be further cooled. The same purpose may be accomplished by dissolving the dry, solid resin in $SO_2$ and extruding, and the temperature and partial pressure of $SO_2$ in the expansion chamber may be varied over wide ranges depending upon the product desired. Apparatus suitable for carrying out this process is shown in Figure I.

Example II

Resin formed by the reaction of $SO_2$ with an unsaturated compound is ground or pulverized and the excess $SO_2$ and other volatile materials are allowed to evaporate. The resin is then charged to a cylinder fitted with a plunger for applying pressure to the resin and with steam coils, electric resistance elements or other means of heating. The resin is heated under pressure until it is fluid. An orifice is opened in the end of the cylinder and the resin is extruded into an expansion chamber where it is quickly cooled in the expanded form. Apparatus suitable for carrying out this process is shown in Figure II.

Example III

Resin formed by the reaction of $SO_2$ with an unsaturated compound is ground or pulverized and is charged to a cylinder fitted with two plungers. Heat and pressure are applied until the resin is fluid. One plunger is suddenly withdrawn and the resin is quickly cooled in the expanded form. That remaining in the cylinder is pushed out with the second plunger. Apparatus suitable for carrying out this process is shown in Figure III.

What we claim and desire to secure by Letters Patent is:

1. A material suitable for heat and sound insulation comprising a resinous reaction product of sulfur dioxide and an olefin containing three or more carbon atoms in expanded, cellular form, and essentially non-plastic at atmospheric temperatures.

2. A substantially cellular material, light in weight, and suitable for heat and sound insulation, the said material containing small gas pockets surrounded by retaining walls of a resinous, polymeric compound formed by the reaction of sulfur dioxide with an olefin of more than three carbon atoms to the molecule, and which polymeric compound is essentially non-plastic at atmospheric temperatures.

3. A substantially cellular material, light in weight, and suitable for heat and sound insulation, the said material containing small gas pockets surrounded by retaining walls of a resinous, polymeric compound formed by the reaction of sulfur dioxide with olefins predominantly of three or more carbon atoms per molecule and essentially non-plastic at atmospheric temperatures.

ROBERT DEWEY SNOW.
HAROLD JOSEPH HEPP.